(12) United States Patent
Van Alstine et al.

(10) Patent No.: US 8,092,682 B2
(45) Date of Patent: Jan. 10, 2012

(54) MATRIX FOR SEPARATION OF POLYETHERS AND METHOD OF SEPARATION

(75) Inventors: James Van Alstine, Uppsala (SE); Jan Bergstrom, Uppsala (SE); Henrik Ihre, Uppsala (SE); Tobias Soderman, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 385 days.

(21) Appl. No.: 12/506,445

(22) Filed: Jul. 21, 2009

(65) Prior Publication Data

US 2009/0281288 A1 Nov. 12, 2009

Related U.S. Application Data

(62) Division of application No. 10/558,103, filed as application No. PCT/SE2004/001273 on Sep. 6, 2004, now abandoned.

(30) Foreign Application Priority Data

Sep. 19, 2003 (SE) ...................... 0302509

(51) Int. Cl.
*B01D 15/08* (2006.01)
(52) U.S. Cl. .............. 210/635; 210/656; 210/198.2; 210/502.1; 568/621
(58) Field of Classification Search .......... 210/635, 210/656, 659, 198.2, 502.1; 568/521
See application file for complete search history.

(56) References Cited

U.S. PATENT DOCUMENTS

| | | | |
|---|---|---|---|
| 3,793,299 A | 2/1974 | Zimmerer | |
| 4,028,290 A | 6/1977 | Reid | |
| 4,029,583 A | 6/1977 | Ho Chang et al. | |
| 4,198,326 A | 4/1980 | Lishevskaya et al. | |
| 4,352,884 A | 10/1982 | Nakashima et al. | |
| 4,663,163 A | 5/1987 | Hou et al. | |
| 5,059,654 A | 10/1991 | Hou et al. | |
| 5,108,596 A | 4/1992 | Ookuma et al. | |
| 5,114,577 A | 5/1992 | Kusano et al. | |
| 5,135,650 A | 8/1992 | Hjerten et al. | |
| 5,583,193 A | 12/1996 | Aravindakshan et al. | |
| 5,648,070 A | 7/1997 | Brian, III et al. | |

(Continued)

FOREIGN PATENT DOCUMENTS

WO WO95/35093 12/1995

(Continued)

OTHER PUBLICATIONS

Antipina, A., et al., "Complex Formation between Poly (methacrylic Acid) and Poly (propylene Glycol) in Aqueous Solutions", Journal of Polymer Science, vol. 32, 1994, p. 1385-1387.

(Continued)

*Primary Examiner* — Ernest G Therkorn (57) ABSTRACT

The present invention relates to a separation matrix comprised of a support to the surfaces of which polymer chains have been coupled, wherein each polymer chain presents recurring proton-donating groups and at least the surface of the support is substantially hydrophilic. In the most advantageous embodiment, the support is porous cross-linked agarose, the polymers are poly(acrylic acid) and the proton-donating groups are carboxyl groups. The matrix is useful e.g. to remove PEG from pegylated and/or native compounds in a liquid. Accordingly, the invention also encompasses a method, such as a chromatographic method, wherein the separation matrix according to the invention is used, for example as a pre-treatment of a reaction mixture that comprises unreacted PEG, pegylated proteins and native proteins.

9 Claims, 4 Drawing Sheets

Adsorption of PEG

U.S. PATENT DOCUMENTS

| | | |
|---|---|---|
| 5,801,238 A | 9/1998 | Tanaka et al. |
| 6,426,315 B1 | 7/2002 | Bergstrom et al. |
| 7,048,858 B2 | 5/2006 | Ihre |
| 7,060,187 B2 | 6/2006 | Ihre et al. |

FOREIGN PATENT DOCUMENTS

| | | |
|---|---|---|
| WO | WO 98/39467 | 9/1998 |
| WO | WO 03/046063 | 6/2003 |

OTHER PUBLICATIONS

Arshady, R., "Styrene Based Polymer Supports Developed by Suspension Polymerization", La Chimica E L'Industria, vol. 70, No. 9, 1988, p. 70-75.

Hjerten, S., "The Preparation of Agarose Spheres for Chromatography of Molecules and Particles", Biochimica et Biophysica Acta, vol. 79, 1964, p. 393-398.

Shen, Y., et al., "End-functionalized Polyethylene Oxide Coated Silica Particles for Packed Capillary Column Supercritical Fluid Chromatography", Chromatographia, vol. 43, No. 7/8, 1996, p. 373-379.

Stuurman, H., et al., "Separation of Proton-Donating Solutes by Liquid Chromatography with a Strong Proton Acceptor, Tri-n-Octylphosphine Oxide, in the Liquid Stationary Phase", Journal of Chromatography, vol. 218, 1981, p. 455-463.

Mike's Laboratory Handbook of Chromatographic and Allied Methods, John Wiley&Sons, 1979, New York, p. 230-231.

Figure 1

Adsorption of PEG

Figure 2
Titration Curve

MATRIX FOR SEPARATION OF POLYETHERS AND METHOD OF SEPARATION

CROSS REFERENCE TO RELATED APPLICATIONS

This application is a divisional of U.S. patent application Ser. No. 10/558,103 filed Nov. 22, 2005, now abandoned, which is a filing under 35 U.S.C. §371 and claims priority to international patent application number PCT/SE2004/001273 filed Sep. 6, 2004, published on Mar. 31, 2005, as WO 2005/029065, which claims priority to application number 0302509-5 filed in Sweden on Sep. 19, 2003.

FIELD OF THE INVENTION

The present invention relates to a separation matrix, which is especially useful for separation and/or isolation of polymeric substances, such as polymer-modified protein drugs or other compounds. The invention also encompasses polymer-binding surfaces useful for example in analytical or biomedical applications. Further, the present invention relates to a method of separation, wherein the novel separation matrix is used, and to a process of producing such a separation matrix.

BACKGROUND OF THE INVENTION

In the pharmaceutical and biopharmaceutical industry, new therapeutic proteins and existing FDA-approved proteins are often modified with compounds that enhance their physical properties, such as solubility, hydrolytic stability and aggregation, as well as their biomedical properties, such as antigenicity, proteolytic stability, serum circulation time, and ease of delivery. At present, modification with poly(ethylene glycol) (PEG), commonly known as pegylation, is the most widely used modification for therapeutic applications. However, other compounds, such as PEG derivatives and neutral hydrophilic polymers, e.g. dextran, are also useful to this end. The same kind of modification is also applied to other molecules than proteins, such as low molecular weight organic drugs and drug candidates.

PEG-modified proteins and low molecular weight drugs is an important class of biopharmaceuticals, which is commonly produced by pegylation of pre-purified molecules. Once the PEG has been contacted with the pre-purified solution under the appropriate conditions, the reaction mixture so obtained will contain unreacted PEG, unmodified molecules and pegylated molecules. Consequently, a subsequent purification step will be required, wherein the target such as a monopegylated or polypegylated molecules is isolated from the other components of the mixture. Since unreacted PEG exhibits both colloidal and detergent properties, and under some solution conditions may precipitate or cause precipitation of proteins there is a well-known risk of interference in the subsequent purification. For example, if chromatography is used to purify the target, the unreacted PEG could promote fouling of the separation matrix. Accordingly, it is important to be able to efficiently remove unreacted PEG from a process as early as possible.

Ultrafiltration has been suggested to remove unreacted PEG. However, this requires a significant size difference between the PEG and the pegylated molecules, which is not always the case. In addition, ultrafiltration is difficult and costly to scale up, and hence not suitable for large-scale processing.

Chromatography is a well known method for purification of liquids, such as reaction mixtures. In chromatography, two mutually immiscible phases are brought into contact. More specifically, the target compound is introduced into a mobile phase, which is contacted with a stationary phase. The target compound will then undergo a series of interactions between the stationary and mobile phases as it is being carried through the system by the mobile phase. The interactions exploit differences in the physical or chemical properties of the components in the sample. In liquid chromatography, a liquid sample, optionally combined with a suitable buffer constitutes the mobile phase, which is contacted with a stationary phase, known as a separation matrix. Usually, the matrix comprises a support to which ligands, which are groups capable of interaction with the target, have been coupled. The principles of chromatography are well known, and extensively described in the literature. In addition, a large number of patent documents describe development in supports and ligand technology.

For example, U.S. Pat. No. 3,793,299 (Zimmerer, R. E.), which was granted in 1974, discloses an early ion exchange material based on a cellulose support. This patent provides a solution to problems caused by the cellulose's affinity for water. More specifically, it had been recognised that prior art ion exchange materials based on cellulose were difficult to use by consequence of the cellulosic material's tendency to swell, gelatinize or disperse on contact with an aqueous solution. To avoid these problems, U.S. Pat. No. 3,793,299 presents a cation exchange material prepared by grafting onto cellulose a polymerisable vinyl monomer which is either carboxylated or carboxylatable on hydrolysis; and thereafter contacting the grafted cellulose with caustic alcoholic or aqueous solution for about 10-30 minutes; after which the caustic treatment is quenched. The product obtained is a cation exchanger, i.e. when used in chromatography, it will interact with a positively charged target via ionic interactions.

More recently, ion-exchange chromatography was disclosed for purification of pegylated viruses. More specifically, WO 98/39467 (Calydon Inc.) describes purification of pegylated adenovirus using the anion exchanger Q SEPHAROSE™ XL (GE Healthcare Bio-Sciences AB, Uppsala, Sweden). Q SEPHAROSE™ XL is a strong anion exchanger comprised of highly crosslinked agarose to which dextran is attached, and its functional groups are quaternary amino.

Another group of ion-exchangers is known as tentacle gels, due to the large tentacle-like groups that extend from the support. One available product marketed for separation of neutral and basic proteins and peptides is FRACTOGEL® EMD COO- (Merck), a weakly acidic cation exchanger wherein the functional groups are carboxyl groups and the solid support is comprised of methacrylate-based copolymer. The functional carboxyl groups are bonded via polyelectrolyte chains enabling the ionic groups to adopt a configuration that is optimal for their electrostatic interaction with the target. Thus, the separation of proteins on FRACTOGEL® EMD COO- is based on reversible electrostatic interactions between the positively charged regions of the protein surface and the support. The strength of the binding depends on the buffer system, the pH value of the buffer which determines the surface charge of the protein as well as the degree of the ionisation of the functional groups of the exchanger, the concentration of the counter ions and the charge density on the support. Elution from FRACTOGEL® EMD COO- is achieved either by high salt concentrations or by decrease of pH.

Finally, it is known that poly(acrylic acid) forms complexes with polyethylene (PEG) in aqueous solutions. Journal of Polymer Science (Journal of Polymer Science: Part A: Polymer Chemistry, Vol. 32, 1385-1387 (1994)) reports that hydrophobic interactions may be of great importance for the stabilisation of such complexes. This is evidenced by the higher stability of a poly(methacrylic acid)-PEG complex than that of the poly(acrylic acid)-PEG complex, which higher stability is explained by the presence of $CH_3$ groups in the poly(methacrylic acid). Further, it appears that subtle changes in acid group structure and underlying matrix may play an important role in this context.

BRIEF DESCRIPTION OF THE INVENTION

In one aspect the present invention provides a separation matrix, wherein the binding and release of target substances is easily controlled by a pH change. This can be achieved by a separation matrix, which enables hydrogen bond interaction with one or more target substance(s). Such a separation matrix is for example useful as a packing of a chromatography column for use in liquid chromatography.

Another aspect of the present invention provides other polymer-binding surfaces, wherein the binding and release of target substances is easily controlled by a pH change.

Yet another aspect of the present invention provides a separation matrix, which allows chromatography at higher salt conditions than conventional ion exchangers do.

A further aspect provides a method of separating polymeric substances, such as proteins, which substances have been modified with at least one polyether, from other components in a liquid, which method enables binding and optionally release in a controlled manner. This can be achieved by a method as described in the appended claims. The method is useful e.g. for isolating a desired target from other components of a liquid, or for removing a specific target from a desired liquid.

A specific aspect of the present invention provides a method of purifying one or more pegylated compounds from a product stream while avoiding fouling promoted by unreacted polyethylene glycol (PEG). Such a product stream may for example be purified in a chromatographic process, in which case the fouling would occur in the separation matrix, in a filtration process or in any other process utilising a similar surface. This can be achieved by introducing a pre-treatment step, wherein the unreacted PEG is removed by hydrogen bonding to a separation matrix according to the invention, followed by any conventional separation method to provide a pure product.

Other aspects and advantages of the present invention will appear from the detailed description provided below.

DEFINITIONS

In the present application, the term "pegylated" means having been modified with polyethylene glycol.

The term "hydrogen bond" means a bond between partially positive hydrogen atoms and electronegative atoms having lone electron pairs.

The term "separation matrix" refers herein to a support to which ligands have been coupled.

The "surface" of a separation matrix as used herein includes both the external surface of the support and the pore surfaces.

The term "$K_a$" is used in its conventional meaning for the dissociation constant of an acid, and consequently "$pK_a$ value" denotes the $-\log K_a$ value.

The term a "functional group" refers to the group that enables a ligand to interact with a target.

DETAILED DESCRIPTION OF THE INVENTION

In a first aspect, the present invention relates to a separation matrix comprised of a porous or non-porous support and recurring proton-donating groups present on polymer chains coupled to the support. More specifically, the invention relates to a separation matrix comprised of a support to the surfaces of which polymer chains have been coupled, wherein each polymer chain presents recurring proton-donating groups and at least the surface of the support is substantially hydrophilic.

Thus, in the present matrix, the proton-donating groups constitute the ligands, which are capable of interaction via hydrogen bonding to any target that presents available proton-accepting groups. The interacting proton-donating groups appear as repeated units i.e. recurring units of a polymer chain. Further, the wording recurring "on polymer chains" is used herein to make clear that the proton-donating groups are coupled to or part of polymer chains, which in turn are coupled to the surfaces of support. Consequently, the proton-donating groups normally have no direct contact points to the support. Thus, proton-donating groups are present on polymer chains at locations more or less distanced from the support, some even extending from the support, depending on the shape and nature of the polymer chains. As the skilled person in this field will easily realise, the present functional groups can be attached to linear and/or branched polymers, or any other kind of polymeric network.

The present support can be made from any organic or inorganic material. The support may be solid, e.g. for use in expanded bed adsorption, or porous, as often used in liquid chromatography. In an advantageous embodiment, the support is porous. In the context of porous supports, it is noted that the term "surface" refers to both the outer surface of the support and to pore surfaces. Accordingly, the support may be in the form of particles, such as essentially spherical particles, monoliths, membranes, chips, and surfaces.

Thus, in a first embodiment, the support is a carbohydrate support, which may be any carbohydrate material as conventionally used for supports in separation methods, such as chromatography or filtration. In one embodiment, the support is comprised of a cross-linked carbohydrate material, such as agarose, agar, cellulose, dextran, chitosan, konjac, carrageenan, gellan, and alginate. In the most preferred embodiment, the matrix is porous cross-linked agarose. The carbohydrate support of the invention is easily prepared by the skilled person in this field in accordance with standard methods, such as inverse suspension gelation (S Hjertén: Biochim Biophys Acta 79(2), 393-398 (1964). Alternatively, the support is based on a commercially available product, such as SEPHAROSE™ FF (a porous cross-linked agarose gel from GE Healthcare Bio-Sciences AB, Uppsala, Sweden), which product is subsequently modified to attach proton-donating groups in accordance with standard methods. This last mentioned embodiment will be discussed in more detail below.

Accordingly, in this embodiment, the separation matrix according to the invention differs from the above-discussed FRACTOGEL® EMD COO- in that the support of the present invention is made from a native polymer, while the FRACTOGEL® EMD COO- comprises a synthetic copolymer support. Further, when used in chromatography, the FRACTOGEL® EMD COO- binds a positively charged target when the ligand is deprotonated, i.e. charged, and releases the target when the ligand becomes protonated. This is exactly the opposite to the function of the present invention, where binding via hydrogen bonding occurs of an uncharged target molecule when the ligand is protonated and release occurs when the ligand is deprotonated i.e. charged and can no longer serve as a proton-donor.

In an alternative embodiment of the present invention, the support of the matrix is a surface-modified synthetic polymer support, wherein the surfaces exhibit hydroxyl groups. Such a synthetic polymer support may be any suitable polymer, preferably a crosslinked synthetic polymer, such as styrene or styrene derivatives, divinylbenzene, acrylamides, acrylate esters, vinyl esters, vinyl ethers, vinyl amides etc, as will be discussed in more detail below, and is easily prepared by the skilled person in this field. In an advantageous embodiment, the surface-modified synthetic polymer of the invention is cross-linked styrene and/or divinyl benzene. Further, in a specific embodiment, the present polymer chains have been coupled to the support via double bonds and epoxides, as will be discussed in more detail below.

As appears from the above, in one embodiment, the support of the present separation matrix is porous. In this context, the term surface refers to the pore surfaces as well as to the outer surfaces of the support.

As regards the proton-donating groups present on polymer chains coupled to the support according to the invention, i.e. the functional groups of the present separation matrix, the skilled person will realise that the polymer chain should have as many groups which are protonated at high pH values as possible. Thus, when present in the separation matrix, the majority of the functional groups present therein should exhibit a resulting $pK_a$ value of above 4.0, such as above 6 and preferably above 7, such above 8. In an alternative embodiment, said $pK_a$ values are within a range of about 4.0-10.0, and any subrange therebetween, such as 4.0-6.0, 6.0-7.0, 7.0-8.0 or 8.0-10.0. In an advantageous embodiment, the functional groups of the separation matrix are predominantly carboxyl groups, which are capable of participating in hydrogen bonding. Carboxyl groups are also easily deprotonated into carboxylate ions, which allows breaking the hydrogen bond simply by increasing the pH to a value above the $pK_a$ value of the carboxylic groups in question, whereby a target substance can be recovered from the present separation matrix. In this context, the term "predominantly" means that most of the functional groups are carboxyl groups, such as at least about 80% thereof, e.g. 80-100%, specifically at least about 90% thereof, e.g. 90-100%, or more specifically at least about 95% thereof, e.g. 95-100%. However, as the skilled person in this field will realise, other proton-donating groups, such as amides, can also participate in the hydrogen bonding of the target substance(s). Further, in a specific embodiment, there is a small amount of groups capable of other interaction present, such as a small number of ion-exchange groups and groups enabling hydrophobic interaction.

The polymer chains which carry the above discussed functional groups can be any suitable polymer, such as a carbon chain or a carbon chain interrupted by heteroatoms, and it can be unsubstituted or substituted, e.g. by methyl, ethyl, or other alkyl groups, aryl groups etc. Thus, in one embodiment, the polymer is a polyethylene imine. Further, the functional groups may be coupled to the carbon chain via another group, such as an alkyl or aryl group. Thus, illustrative examples according to the invention of polymer chains carrying functional groups are poly(acrylic) acid, poly(meth)acrylic acid, poly(aryl) acid, poly(malic acid), poly(malonic acid), poly (malic acid), polyphenol-containing polymers, polyamides, vinyl ethers etc. In an advantageous embodiment of the present separation matrix, the polymer chains are predominantly poly(acrylic acid) chains.

The polymer chains should be of a size sufficient to allow a satisfactory binding of one or more target substances. Thus, if the target substance is an elongated molecule, such as a polymer, then the length of the polymer chain should be adapted to the number of proton-accepting groups of the target substance to allow multiple attachment points between the two. In one embodiment, each polymer chain is comprised of about 5-1000, and the invention encompasses all subranges therebetween, such as about 50-500, for example about 100-500 monomer units. The skilled person in this field can select a suitable size of the polymer chain for each case, e.g. considering the risk of a long polymer chain being wound around a smaller sized target molecule. Thus, the size of the polymer chain should be reasonably adapted to the size of the target molecule. As the skilled person will realise, in case of a porous support, the size of the polymer chains will also depend on pore size. The density i.e. the number of polymer chains per unit area on the support should be adapted to allow an optimal interaction with target molecules.

In an advantageous embodiment, the separation matrix comprises polymer chains that have been grafted to the carbohydrate. In this field, grafting means that monomers are polymerised in situ at the surface of the support. Grafting can be performed to provide a dense polymeric surface coating. The polymerisation is initiated at reactive groups, such as double bonds, present on the support. Depending on the nature of the support, reactive groups are either already present, e.g. unreacted vinyl groups on a synthetic support, or easily provided e.g. by transforming hydroxyl groups of a carbohydrate support. (For a review of different principles of grafting, see e.g. P F Rempp, P J Lutz: Comprehensive Polymer Science vol. 6, pp 403-421, Eds. G Allen et al, Oxford 1989. For preparation of synthetic chromatography supports by grafting, see WO 03/046063, GE Healthcare Bio-Sciences AB. In an alternative embodiment, the present polymers are prepared separately and coupled to the support using conventional technology. Further specific examples of alternative methods for coupling of polymers to the support are e.g. coupling of reactive compounds such as silanes, pretreatment of the support surface with polymers like polyethyleneimine and then grafting acid groups onto the reactive layer of amines, use of polysiloxane in situ formed coatings etc. The skilled person in this field can adapt the conditions in order to obtain a sufficiently dense surface coverage of the proton donating groups for the intended application. Further details for the preparation of the present separation matrix will be provided below in the context of the fourth aspect of the invention.

In one embodiment, the separation matrix according to the invention is capable of separating polymeric target substances from other components of a liquid, preferably in liquid chromatography, which target substances contain groups that are rich in oxygens and hence capable of participating as proton acceptors in hydrogen bond interactions. Thus, such target substances are in a preferred embodiment polyethers, which present such proton acceptors in a repeated manner and consequently allow interaction with the separation matrix at a plurality of sites simultaneously. Examples of such polyethers are e.g. polyethylene glycol (PEG), polypropylene glycol (PPG), PEG-PPG block copolymers, PEG-PPG copolymers, PLURONIC® (BASF) and other PEG-PPG-PEG triblock polymers, ethylhydroxyethylcellulose (EHEC) and similar polymers, polymerised allylglycidyl ether, polymerised phenyl glycidyl ether, plus various surfactants and other compounds which utilise the above mentioned polyethers. In the most advantageous embodiment, the present separation matrix is capable of separating PEG from pegylated compounds and/or non-modified compounds in a liquid. In an advantageous embodiment, the compounds are proteins, such as protein drugs or antibodies. Further examples of compounds in this context are virus and any other compound which is readily pegylated. Thus, the present separation is capable of isolating PEG and/or any analogue ethoxylated substance, from a liquid. Other examples of compounds that are sometimes pegylated and hence can be isolated using the present separation matrix are liposomes, particles, and cells.

As discussed above in the section Background of the Invention, it has been shown according to Journal of Polymer Science (Journal of Polymer Science: Part A: Polymer Chemistry, Vol. 32, 1385-1387 (1994)) that poly(acrylic acid) forms complexes with PEG in aqueous solutions, but that complex stability was increased if poly(methacrylic acid) replaced the poly(acrylic acid). Accordingly, it would have been assumed that the stability of poly(acrylic acid)-PEG interactions were relatively weak. However, as appears from the above, the present invention unexpectedly shows that such complexing is sufficiently strong for use in separation methods such as chromatography.

The capability of the present separation matrix or surface to bind polyether target substances can be utilised in various contexts, such as for medical or analytical applications or in production processes.

Accordingly, in a second aspect, the present invention relates to the use of a separation matrix as described above is in the purification of pegylated compounds. In the best embodiment, the matrix, which is a porous carbohydrate support comprising poly(acrylic acid) and carboxyl groups, is used to separate PEG from pegylated and native proteins in a liquid.

In a third aspect, the present invention relates to a method of separating at least one polyether target substance from other components of a liquid, which method comprises the steps of (a) providing a separation matrix comprised of a support to the surfaces of which polymer chains have been coupled, wherein each polymer chain presents recurring proton-donating groups and at least the surface of the support is substantially hydrophilic;

(b) at a pH below about 6, contacting the liquid with said separation matrix to allow hydrogen bonding between the proton-donating groups of the separation matrix and proton-accepting ether oxygens of the target substance(s); and, optionally;

(c) recovering one or more target substances from the separation matrix by contacting said matrix with an eluent.

In an illustrative embodiment, the present method is a method of chromatography, which is a widely used and well-known separation technique. In general terms, in step (a), a suitable separation matrix is prepared in accordance with well-known methods and provided in a column. In step (b), the liquid is passed through the column, either by gravitational flow or pumped across, for example in an expanded bed, under conditions that favour hydrogen bonding of the target substance(s) to the functional groups of the matrix. As is well known, care should be taken not to exceed the adsorption capacity of the matrix, i.e. the flow should be sufficiently slow to allow a satisfactory bonding. In this step, other components of the liquid will pass through in principle unimpeded. If needed, the matrix is washed, preferably with an aqueous solution or a buffer, between steps (b) and (c) in order to remove retained and/or loosely bound substances. In step (c), the eluent is any liquid or solution that causes deprotonation of the functional groups. In other words, the purpose of step (c) is to prevent proton donation and hydrogen bonding, which results in desorption i.e. release of the target substance(s).

An advantage with the present method is that it is operable under conditions where the salt concentration is too high for ionic interactions and too low for hydrophobic interactions. Further, process conditions do not have to be optimised for the method at the cost of loosing efficiency in preceding for following steps, or having to add an additional buffer modification step. Accordingly, it is simple and cost-effective, and also possible to scale-up without many particular considerations. This is an advantage in view of the previously suggested ultrafiltration methods for dealing with PEG.

More specifically, in one advantageous embodiment, the separation matrix comprises a carbohydrate support as described above in relation to the first aspect of the invention.

In an alternative embodiment, the separation matrix comprises a synthetic support, for example made from cross-linked synthetic polymers, such as styrene or styrene derivatives, divinylbenzene, acrylamides, acrylate esters, methacrylate esters, vinyl esters, vinyl amides etc. Such polymers are easily produced according to standard methods; see e.g. "Styrene based polymer supports developed by suspension polymerization" (R Arshady: Chimica e L'Industria 70(9), 70-75 (1988)). Alternatively, a commercially available product is surface-modified to exhibit proton-donating functional groups attached in a repeated manner on polymer chains as described in relation to the separation matrix according to the invention.

The conditions for the hydrogen bonding of step (b) are selected depending on the nature, and specifically on the resulting range of $pK_a$ values, of the functional groups of the separation matrix. As also discussed above, the pH in the liquid at the contacting should be adapted in relation to said $pK_a$ value range to ensure that the proton-donating groups are not deprotonated but capable of forming hydrogen bonds. In one embodiment of the present method, step (b) is performed at a pH below about 5, preferably in a range of 3-4. In a specific embodiment, step (b) is performed at a pH of about 3.

The conditions for the recovery of step (c) are, in accordance with the above, selected to ensure that the functional groups of the separation matrix are deprotonated and hence release the previously bound target substance(s). Thus, in step (c), the target substance(s) are released from the separation matrix at a pH that exceeds the $pK_a$ value of the functional groups. In an advantageous embodiment, the eluent of step (c) comprises an increasing pH gradient. The pH-gradient can be a continuous or a step-wise gradient, and will allow selective elution, and hence separate recovery, of two or more different target substances. In an alternative embodiment, the eluent of step (c) comprises a salt gradient. In yet another embodiment, step (c) is provided by adding a competitive binder in the eluent or by adding a compound that displaces the target substance(s) on the matrix. The skilled person can easily select a suitable eluent and conditions for step (c) depending on the nature of the functional groups.

As mentioned above in relation to the use of the separation matrix according to the invention, the target substance(s) are in a preferred embodiment polyethers, which present proton acceptors in a repeated manner and consequently allow interaction with the separation matrix at a plurality of sites simultaneously. Examples of such polyethers are polyethylene glycol (PEG) and polypropylene glycol (PPG). Thus, in a specific embodiment, a first target substance may be a pegylated protein or peptide, and a second target substance may be native PEG. Such pegylated proteins or peptides can be any proteins, such as enzymes, antibodies etc, preferably for use in the pharmaceutical industry as discussed in the section Background above. Other possible target substances are pegylated virus or pegylated organic compounds, such as drugs or drug candidates. The present method is especially advantageous as regards the removal of unreacted PEG from a product stream to avoid problems such as fouling of chromatography columns.

In a specific embodiment, the invention is a method of purification of a pegylated compound from a reaction mixture comprising pegylated compounds, unreacted PEG and native compounds, e.g. peptides and/or proteins, which comprises a method as described above for removal of the unreacted PEG followed by a step of chromatography, such as cation exchange, to isolate the pegylated compound in a pure form. This method is advantageous as compared e.g. to the method of purification of pegylated adenovirus suggested in the above discussed WO98/39467 (Calydon Inc.), since the pre-treatment will reduce the risk of clogging of the cation exchanger. However, as appears from the present specification, all steps of such a method may alternatively be performed on the separation matrix according to the invention.

In an alternative embodiment, the present method is used to also bind pegylated compounds, e.g. peptides and/or proteins. By the appropriate adjustments of salt concentrations and buffer pH, the skilled person in this field can preferentially bind PEG over pegylated compound. For example, in the case of monopegylated compounds, the strength of interaction of the present separation matrix with the components of a reaction mixture is then presumably PEG> monopegylated compound> native compound. In this embodiment, gradient mode elution is advantageously used in step (c).

In an additional embodiment, the present invention is used to remove polyether or polyether-modified material, such as pegylated material, from a product stream. In this embodiment, an advantageous form of the separation is a filter.

The present invention also encompasses a specific embodiment of this third aspect, wherein the target substance has been modified with a polymer chain that contains proton-donating groups, while the support matrix is comprised of a porous or non-porous support and recurring ether groups present on polymer chains coupled to said support. Thus, in this embodiment, the proton-donating and proton-accepting groups have changed place as compared to what has been discussed above. However, other details regarding the nature of the proton-donating and proton-accepting groups, the nature of the support, conditions of use etc can be found above and in the disclosure that follows.

In a fourth aspect, the present invention relates to a process of preparing a separation matrix as described above, which comprises to convert an ion exchange matrix into a hydrogen bond matrix by modification of its surface with poly(acrylic acid) groups. Methods for performing such a modification are well known to those of skill in this field. In brief, the first step is advantageously to introduce double bonds onto the surface of a suitable support, e.g. via hydroxyl groups present on the surface of SEPHAROSE™ (GE Healthcare Bio-Sciences AB, Uppsala, Sweden), for example by treatment with an epoxide carrying an allyl functionality at a suitable temperature and reaction time. One example of such a commonly used allyl-functional epoxide is allyl glycidyl ether (AGE). The polymer chains are subsequently coupled to the allyl groups by any well-known method, such as by epoxy activation or radical addition. In an alternative embodiment, monomers are polymerised in situ to the allyl groups by grafting, for example using vinyl ethers. Accordingly, in a specific embodiment, acrylic acid monomers are added to an allylated matrix surface by grafting. For more details regarding grafting of vinyl ethers, see WO 03/046063, which is hereby incorporated by reference.

Thus, in one embodiment, the polymer chains of the present separation matrix are characterised by having been coupled to the support via a reactive double bond. In an especially preferred embodiment, the polymer chains of the separation matrix are characterised by being coupled to the support via a linker, which can be any conventionally used compound, such as allyl bromide or, preferably, allyl glycidyl ether. Consequently, in the last mentioned cases, the linker that connects the support with the polymer chain is allyl ether or allylhydroxypropyl, respectively.

Finally, the present invention also encompasses a system comprising a vessel packed with a separation matrix according to the invention, preferably a chromatography column filled with a separation matrix in the form of a gel. Also encompassed is a kit comprising a separation matrix according to the invention, optionally present in a chromatography column, an eluent for releasing target substances bound to the separation matrix and written instructions for the use thereof. Said components of the kit are packed in separate compartments.

EXAMPLES

Below, the present invention will be explained in more detail by way of examples, which however are not to be construed as limiting the present invention as defined by the appended claims. All references given below and elsewhere in the present specification are hereby included herein by reference.

Example 1

Synthesis of a Separation Medium According to the Invention 50 mL of a crosslinked porous agarose gel (SEPHAROSE™ FF) was allylated according to standard procedures in an aqueous solution containing sodium hydroxide and allyl glycidyl ether to an allyl level of 0.30 mmol allyl/ml. The allylated gel was subsequently washed on a glass filter with 500 ml distilled water and suction dried. The washed material was transferred to a three necked round flask provided with a propeller stirrer. Thereafter 100 ml of water, 20 ml acrylic acid and 0.25 g 4,4'-Azo-bis(4-cyanopentanoic acid) were added. The reaction was run under stirring at 70° C. over night. After 30 minutes, the reaction mixture became viscous. After reaction, the particles were washed with an excess (approximately 1.5 L) of water, ethanol and 23% ethanol.

Example 2

Adsorption of PEG 4000 to Separation Medium According to the Invention 1 ml poly(acrylic acid) grafted SEPHAROSE™ 6FF (GE Healthcare Bio-Sciences AB, Uppsala, Sweden) prepared as described in example 1 above was packed in a HR 5/5 column (GE Healthcare Bio-Sciences AB, Uppsala, Sweden). The column was then connected to an ÄKTAT™ explorer chromatography system from GE Healthcare Bio-Sciences AB. A refractive index detector was used for monitoring the chromatographic run.

Figure 1:
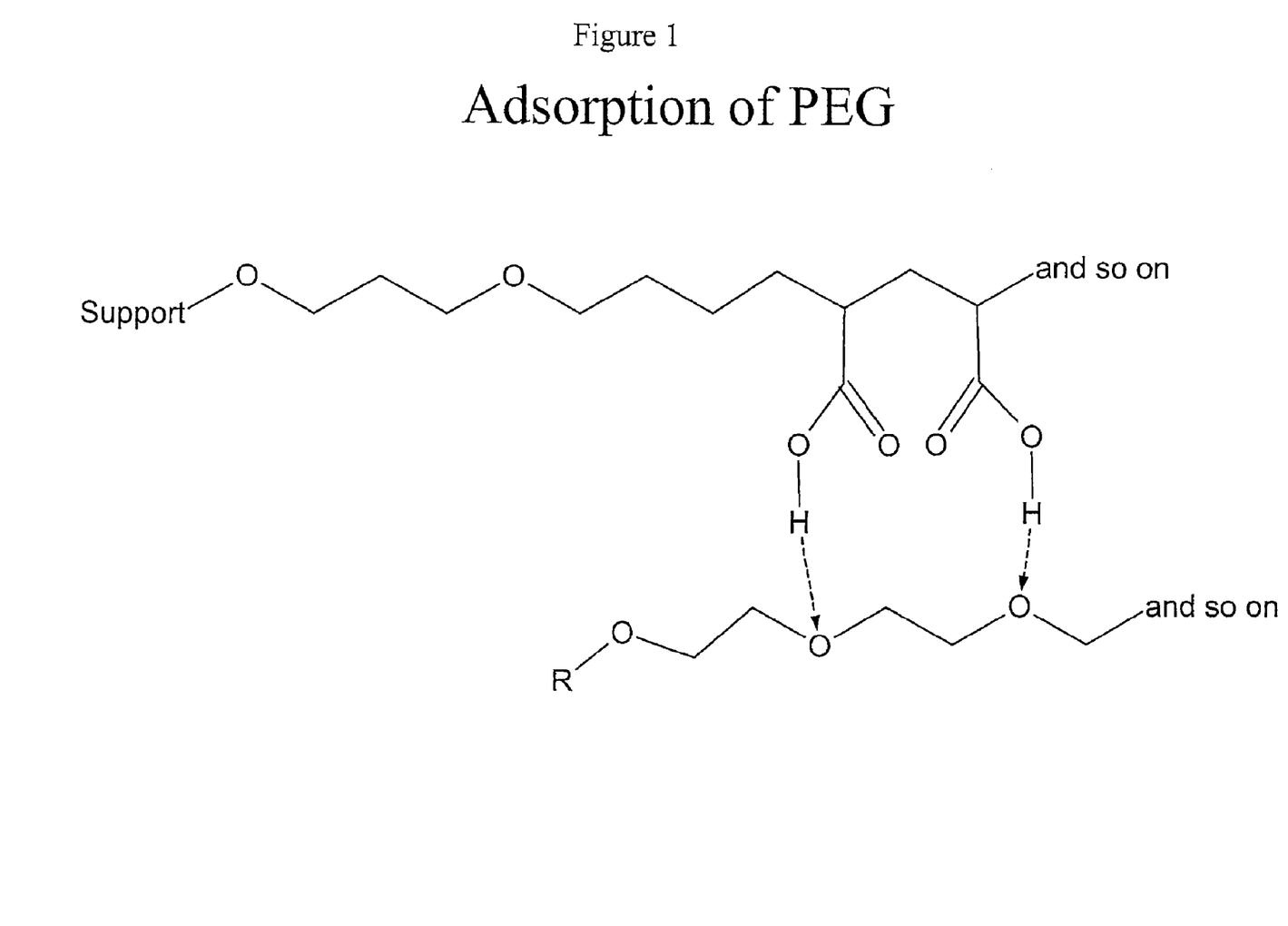
FIG. 1 illustrates the hydrogen bonding principle used in the present invention by showing schematically how proton-donating groups present on polymer chains coupled to a support interact with the oxygen atoms of a polyether target substance. Thus, this figure shows how e.g. PEG is adsorbed to a separation matrix according to the invention.
Figure 2:
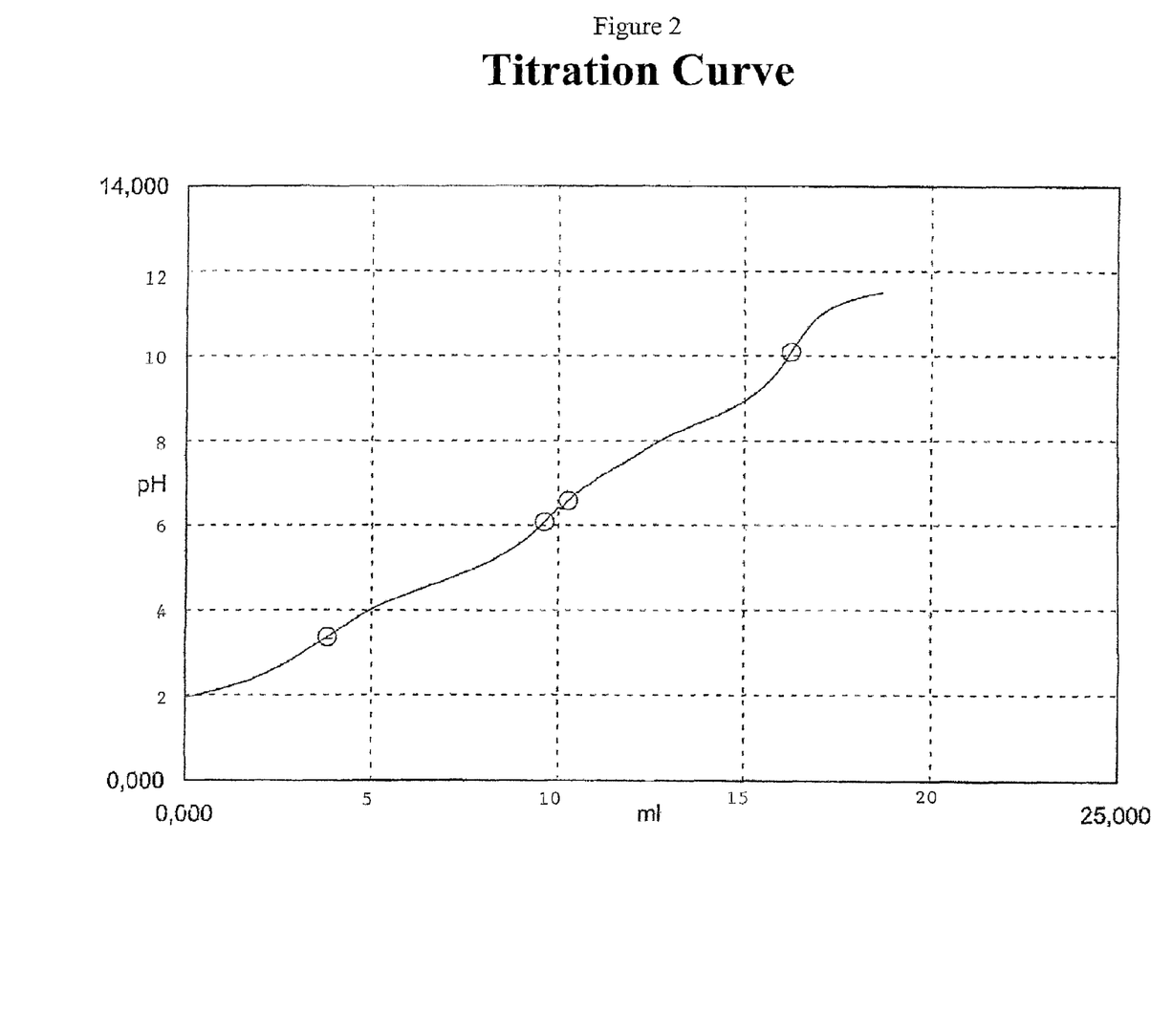
FIG. 2 shows a titration curve of a poly(acrylic acid) agarose separation matrix prepared according to example 1 below. More specifically, the titration was performed at 0.1M NaOH to pH 11.5. The x-axis shows the volume of NaOH in ml, while the y-axis shows pH. The slope of the curve indicates that there are carboxyl groups with pKa values within a broad range.
Figure 3:
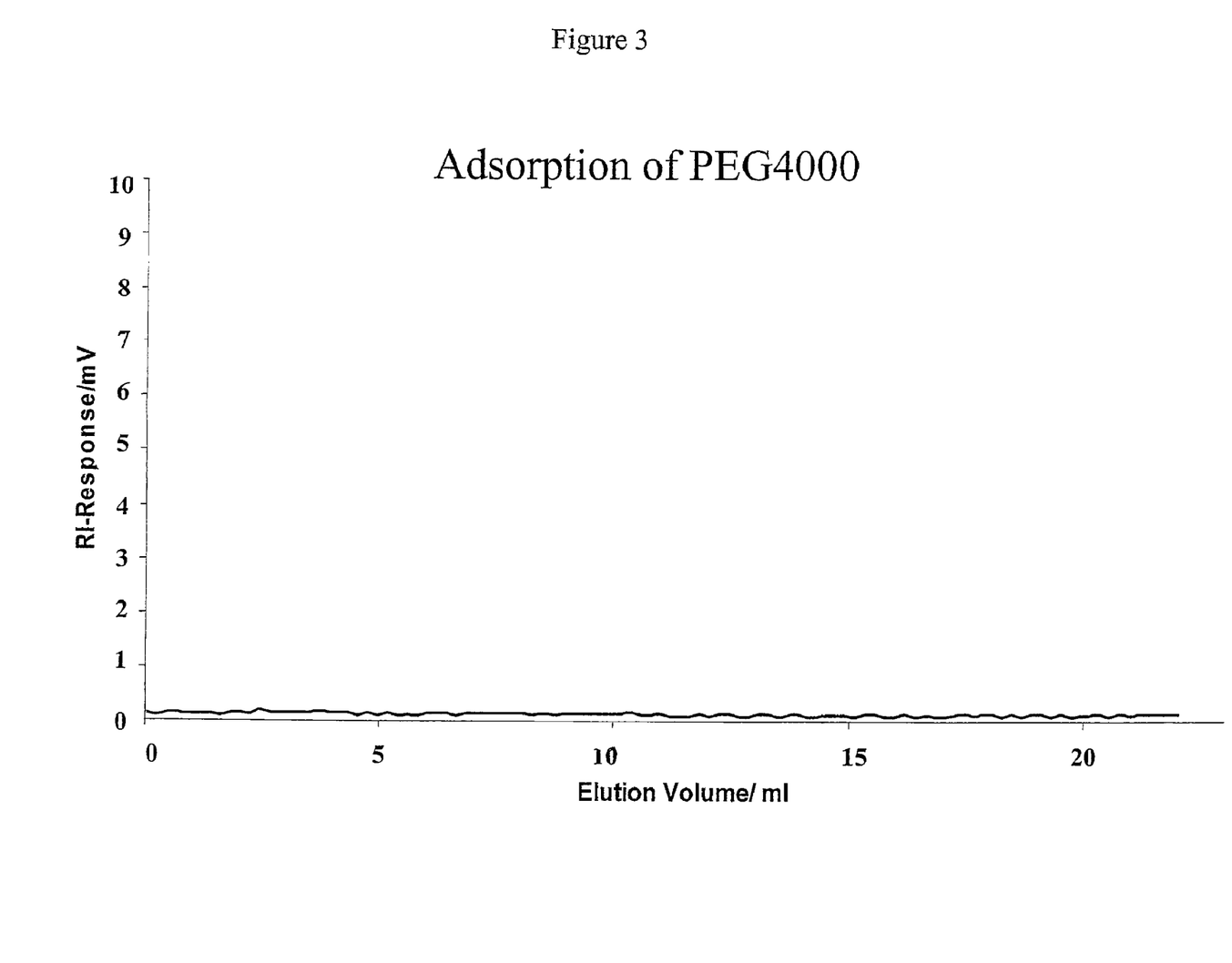
FIG. 3 shows the chromatogram obtained as described in example 2 below. The flow rate was 1 ml/min, and the eluent was a buffer of 20 mM HCOOH—NaOH, pH 3.

After equilibration of the column at pH 3, a 50 µl sample containing 5% PEG 4000 (Merck) dissolved in 20 mM HCOOH—NaOH, pH 3 buffer was injected at a flow rate of 1 ml/min. Elution at 1 ml/min with more than 15 column volumes of 20 mM formic acid adjusted to pH 3 with sodium hydroxide did not result in any desorption of the adsorbed PEG 4000. As appears from FIG. 3, no peak appeared in the chromatogram, which indicates that PEG 4000 is readily adsorbed to the separation matrix according to the invention.

Example 3 Comparative

Attempt to Adsorb PEG4000 to a Conventional Ion Exchanger 1 ml CM SEPHAROSE™ FF (GE Healthcare Bio-Sciences AB, Uppsala, Sweden), which is a crosslinked agarose support with weak carboxymethyl cation exchanging groups was packed in a HR 5/5 column (GE Healthcare Bio-Sciences AB, Uppsala, Sweden) and connected to an ÄKTA™ explorer chromatography system from GE Healthcare Bio-Sciences AB. A refractive index detector was used for monitoring the chromatographic run. 20 mM formic acid adjusted to pH 3 with sodium hydroxide was used as eluent.

Figure 4:
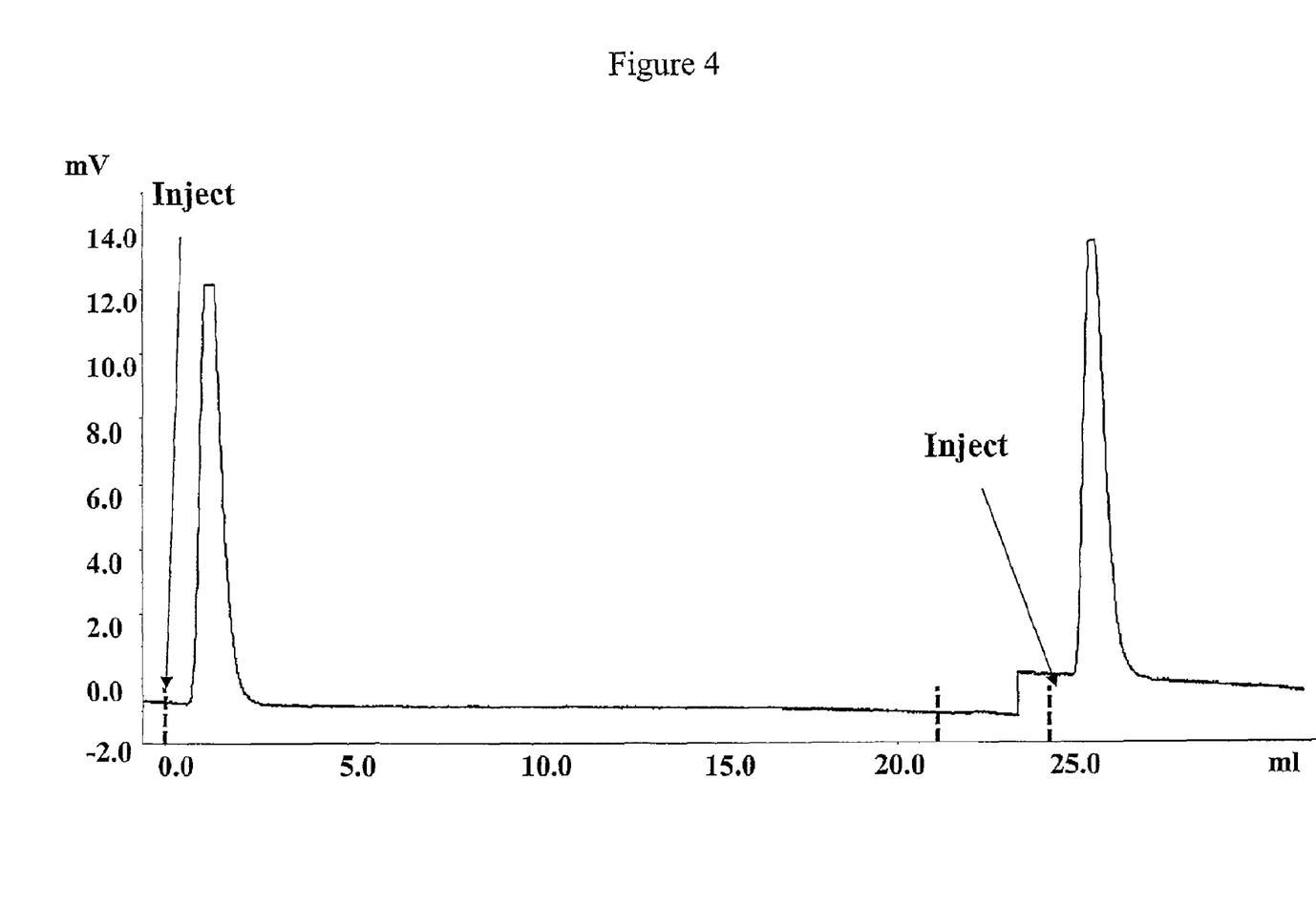
FIG. 4 shows the reference chromatogram obtained as described in example 3 below, i.e. using a conventional carboxymethyl cation exchanger (CM SEPHAROSE™ FF, (GE Healthcare Bio-Sciences AB, Uppsala, Sweden) under the conditions used in Example 2. Thus, the flow rate and eluent was as described above.

After equilibration of the column at pH 3, a 50 µl sample containing 5% PEG 4000 dissolved in 20 mM HCOOH—NaOH, pH 3 buffer was injected at a flow rate of 1 ml/min. Pumping at 1 ml/min 20 mM formic acid adjusted to pH 3 with sodium hydroxide through the column resulted in a fast elution of PEG 4000. As appears from FIG. 4, a peak appeared in the beginning of the chromatogram, which shows that PEG 4000 is not adsorbed to the conventional carboxylated separation matrix under conditions equivalent to those used in example 2 above.

It is apparent that many modifications and variations of the invention as hereinabove set forth may be made without departing from the spirit and scope thereof. The specific embodiments described are given by way of example only, and the invention is limited only by the terms of the appended claims.

What is claimed is:

1. A method of separating at least one polyether target substance from other components of a liquid, comprising the steps:
   (a) providing a separation matrix comprised of a support having surfaces of which polymer chains have been coupled, wherein each polymer chain presents recurring proton-donating groups and at least the surface of the support is substantially hydrophilic;
   (b) contacting, at a pH below about 6, the liquid with said separation matrix to allow hydrogen bonding between the proton-donating groups of the separation matrix and proton-accepting ether oxygens of the polyether target substance(s); and
   (c) recovering one or more target substances from the separation matrix by contacting said matrix with an eluent, which eliminates hydrogen bonding or competes with the target for hydrogen bonding to the support.

2. The method of claim 1, wherein the proton-donating groups of the separation matrix are predominantly carboxyl groups.

3. The method of claim 1, wherein the polymer chains of the separation matrix are predominantly poly(acrylic acid) chains.

4. The method of claim 1, wherein in step (b), the pH is below about 4, and preferably below about 3.

5. The method of claim 1, wherein the eluent of step (c) comprises an increasing pH gradient.

6. The method of claim 1, wherein the polyether target substance is PEG or a pegylated compound, such as a protein.

7. The process of purifying a pegylated compound from a reaction mixture, which comprises a pre-treatment step to remove PEG and a subsequent step to isolate one or more pegylated compounds, wherein the pre-treatment is the method of claim 1.

8. The process of claim 7, wherein the compounds are proteins.

9. The process of claim 7, wherein the subsequent step to isolate one or more pegylated compounds is a liquid chromatography step.

* * * * *